United States Patent
Gudmundson et al.

(10) Patent No.: US 9,213,735 B1
(45) Date of Patent: Dec. 15, 2015

(54) FLOW CONTROL IN VERY LARGE QUERY RESULT SETS USING A RELEASE MESSAGE TO CONFIRM THAT A CLIENT COMPUTER IS READY TO RECEIVE THE DATA ASSOCIATED WITH A DATA COLLECTION OPERATION

(75) Inventors: Stephan Gudmundson, Los Altos, CA (US); Daniel Halem, Oakland, CA (US); Justin Legakis, Sunnyvale, CA (US); Gokul Nath Babu Manoharan, Mountain View, CA (US)

(73) Assignee: Google Inc., Mountain View, CA (US)

(*) Notice: Subject to any disclaimer, the term of this patent is extended or adjusted under 35 U.S.C. 154(b) by 996 days.

(21) Appl. No.: 13/357,950

(22) Filed: Jan. 25, 2012

(51) Int. Cl.
*G06F 7/00* (2006.01)
*G06F 11/00* (2006.01)
*G06F 15/16* (2006.01)
*G06F 15/173* (2006.01)
*G06F 17/30* (2006.01)

(52) U.S. Cl.
CPC .... *G06F 17/30386* (2013.01); *G06F 17/30445* (2013.01); *G06F 17/30463* (2013.01); *G06F 17/30474* (2013.01); *G06F 17/30516* (2013.01); *G06F 17/30522* (2013.01); *Y10S 707/99932* (2013.01); *Y10S 707/99933* (2013.01)

(58) Field of Classification Search
CPC .......... G06F 17/30386; G06F 17/30445; G06F 17/30463; G06F 17/30474; G06F 17/30516; G06F 17/30522; Y10S 707/99933; Y10S 707/99932
USPC .......... 709/224, 223, 232; 370/235; 707/736, 707/769
See application file for complete search history.

(56) References Cited

U.S. PATENT DOCUMENTS

| | | | |
|---|---|---|---|
| 5,553,234 A * | 9/1996 | Cotner et al. .................. 714/16 |
| 5,574,900 A * | 11/1996 | Huang et al. |
| 5,796,934 A | 8/1998 | Bhanot et al. |
| 5,835,755 A * | 11/1998 | Stellwagen, Jr. .............. 707/764 |
| 5,873,075 A * | 2/1999 | Cochrane et al. |
| 6,009,265 A * | 12/1999 | Huang et al. |
| 6,105,017 A | 8/2000 | Kleewein et al. |
| 6,205,465 B1 * | 3/2001 | Schoening et al. ........... 718/102 |
| 6,208,990 B1 * | 3/2001 | Suresh et al. |
| 6,324,683 B1 * | 11/2001 | Fuh et al. ........................ 717/124 |
| 6,507,834 B1 | 1/2003 | Kabra et al. |
| 7,010,521 B2 * | 3/2006 | Hinshaw et al. |
| 7,080,101 B1 * | 7/2006 | Watson et al. |
| 7,089,331 B1 * | 8/2006 | Gollapudi et al. ............ 709/247 |
| 7,103,590 B1 * | 9/2006 | Murthy et al. |
| 7,181,623 B2 * | 2/2007 | Golubchik ............ H04L 63/126 713/153 |
| 7,185,000 B1 * | 2/2007 | Brown et al. .................. 707/718 |
| 7,260,569 B1 * | 8/2007 | Stegelmann et al. ......... 707/781 |

(Continued)

*Primary Examiner* — Daniel C Murray
(74) *Attorney, Agent, or Firm* — Fish & Richardson P.C.

(57) ABSTRACT

Apparatuses and methods for providing flow control over a network are disclosed. One such method comprises receiving a first remote procedure call at a first computer from a second computer remote from the first computer, the first computer including a first memory and a first processor configured to execute instructions stored in the first memory, generating a second remote procedure call from the first processor to the second computer, the second remote procedure call responsive to the first remote procedure call, monitoring the first processor for receipt of a release signal from the second computer, the release signal indicating when the second computer is able to receive data responsive to the first remote procedure call, and transmitting the data from the first memory of the first computer to the second computer responsive to receipt of the release signal at the first processor.

17 Claims, 4 Drawing Sheets

(56) References Cited

U.S. PATENT DOCUMENTS

| | | | |
|---|---|---|---|
| 7,337,163 B1 | 2/2008 | Srinivasan et al. | |
| 7,389,284 B1 * | 6/2008 | Surlaker et al. | 707/714 |
| 7,403,995 B2 | 7/2008 | Mace et al. | |
| 7,448,047 B2 * | 11/2008 | Poole et al. | 719/316 |
| 7,451,133 B2 * | 11/2008 | Yoaz et al. | |
| 7,464,106 B2 * | 12/2008 | Hinshaw et al. | |
| 7,475,056 B2 * | 1/2009 | Ghosh et al. | |
| 7,508,397 B1 | 3/2009 | Molnar et al. | |
| 7,522,169 B1 | 4/2009 | Muliadi et al. | |
| 7,529,752 B2 * | 5/2009 | Hinshaw et al. | |
| 7,574,424 B2 * | 8/2009 | Chowdhuri | |
| 7,577,667 B2 * | 8/2009 | Hinshaw et al. | |
| 7,599,923 B2 * | 10/2009 | Brown et al. | |
| 7,610,351 B1 * | 10/2009 | Gollapudi et al. | 709/217 |
| 7,634,477 B2 * | 12/2009 | Hinshaw | |
| 7,660,785 B1 * | 2/2010 | Ladha et al. | 707/999.003 |
| 7,685,095 B2 * | 3/2010 | Ghosh et al. | 707/999.002 |
| 7,698,338 B2 * | 4/2010 | Hinshaw et al. | 707/754 |
| 7,719,982 B2 | 5/2010 | Varma | |
| 7,730,057 B2 * | 6/2010 | Bell et al. | 707/720 |
| 7,730,077 B2 * | 6/2010 | Hinshaw et al. | 707/754 |
| 7,761,568 B1 * | 7/2010 | Levi | H04W 4/02 709/217 |
| 7,809,826 B1 * | 10/2010 | Guruswamy | 709/224 |
| 7,810,151 B1 * | 10/2010 | Guruswamy | 726/13 |
| 7,831,575 B2 * | 11/2010 | Trossell et al. | 707/705 |
| 7,921,130 B2 * | 4/2011 | Hinshaw et al. | 707/769 |
| 7,937,755 B1 * | 5/2011 | Guruswamy | 726/22 |
| 8,001,329 B2 * | 8/2011 | von Praun | 711/129 |
| 8,051,422 B2 * | 11/2011 | Narita et al. | 718/104 |
| 8,056,141 B2 * | 11/2011 | Shulman et al. | 726/27 |
| 8,059,128 B1 | 11/2011 | Legakis et al. | |
| 8,073,826 B2 * | 12/2011 | Srinivasan et al. | 707/702 |
| 8,126,870 B2 * | 2/2012 | Chowdhuri et al. | 707/713 |
| 8,145,859 B2 * | 3/2012 | Park et al. | 711/159 |
| 8,150,852 B2 * | 4/2012 | Komatsu et al. | 707/737 |
| 8,209,756 B1 * | 6/2012 | Guruswamy et al. | 726/23 |
| 8,266,267 B1 * | 9/2012 | Guruswamy et al. | 709/223 |
| 8,296,316 B2 * | 10/2012 | Jain et al. | 707/769 |
| 8,321,450 B2 * | 11/2012 | Thatte et al. | 707/769 |
| 8,326,921 B2 * | 12/2012 | Naka | G06F 13/385 709/203 |
| 8,374,997 B2 * | 2/2013 | Phibbs et al. | 707/609 |
| 8,375,351 B2 * | 2/2013 | Ahadian et al. | 717/101 |
| 8,386,466 B2 * | 2/2013 | Park et al. | 707/713 |
| 8,387,076 B2 * | 2/2013 | Thatte et al. | 719/328 |
| 8,392,880 B2 * | 3/2013 | Ahadian et al. | 717/115 |
| 8,447,744 B2 * | 5/2013 | de Castro Alves et al. | 707/702 |
| 8,447,774 B1 * | 5/2013 | Robie et al. | 707/760 |
| 8,453,255 B2 * | 5/2013 | Shulman et al. | 726/27 |
| 8,498,956 B2 * | 7/2013 | Srinivasan et al. | 706/52 |
| 8,521,867 B2 * | 8/2013 | Srinivasan et al. | 709/224 |
| 8,527,458 B2 * | 9/2013 | Park et al. | 707/634 |
| 8,543,558 B2 * | 9/2013 | Srinivasan et al. | 707/702 |
| 8,566,793 B2 * | 10/2013 | Ahadian et al. | 717/125 |
| 8,589,436 B2 * | 11/2013 | Srinivasan et al. | 707/780 |
| 8,676,749 B2 * | 3/2014 | Shang et al. | 707/610 |
| 8,676,841 B2 * | 3/2014 | Srinivasan et al. | 707/780 |
| 8,713,049 B2 * | 4/2014 | Jain et al. | 707/779 |
| 8,825,805 B2 * | 9/2014 | Gollapudi et al. | 709/219 |
| 8,880,551 B2 * | 11/2014 | Hinshaw et al. | 707/770 |
| 8,959,106 B2 * | 2/2015 | de Castro Alves et al. | 707/768 |
| 2002/0032865 A1 * | 3/2002 | Golubchik | H04L 63/126 713/178 |
| 2007/0061586 A1 * | 3/2007 | Golubchik | H04L 63/126 713/178 |
| 2010/0161651 A1 | 6/2010 | Cras | |
| 2010/0250664 A1 * | 9/2010 | Naka | G06F 13/385 709/203 |
| 2012/0066290 A1 | 3/2012 | Amsterdam et al. | |
| 2015/0195229 A1 * | 7/2015 | Schaefer | H04L 67/06 709/206 |

* cited by examiner

FLOW CONTROL IN VERY LARGE QUERY RESULT SETS USING A RELEASE MESSAGE TO CONFIRM THAT A CLIENT COMPUTER IS READY TO RECEIVE THE DATA ASSOCIATED WITH A DATA COLLECTION OPERATION

TECHNICAL FIELD

The present invention relates in general to networking and more particularly to controlling the flow of data over a network.

BACKGROUND

When a server is sending a large amount of data to a client, some form of flow control is required to avoid unbounded accumulation of data in buffers at some point in the system. Transmission Control Protocol (TCP) uses the general idea of a credit or reservation scheme, where the data consumer (e.g. the client) provides the server with credits for transmitting data.

SUMMARY

Flow control on a network, particularly a multi-tiered server network, is considerably more difficult than that in a point-to-point system. Herein, embodiments of an apparatus and method for flow control on a network are disclosed. In accordance with one aspect of the disclosed embodiments, a method of providing flow control over a network comprises receiving a first remote procedure call at a first computer from a second computer remote from the first computer, the first computer including a first memory and a first processor configured to execute instructions stored in the first memory, generating a second remote procedure call from the first processor to the second computer, the second remote procedure call responsive to the first remote procedure call, monitoring the first processor for receipt of a release signal from the second computer, the release signal indicating when the second computer is able to receive data responsive to the first remote procedure call, and transmitting the data from the first memory of the first computer to the second computer responsive to receipt of the release signal at the first processor, thereby providing flow control over the network.

Another aspect of the invention includes a method of providing flow control over a network comprising transmitting a first remote procedure call from a first computer to a second computer remote from the first computer, the first computer including a first memory and a first processor configured to execute instructions stored in the first memory, and generating a release signal from the first computer to the second computer responsive to receipt of a second remote procedure call by the first processor, the release signal indicating when the first computer is able to receive data responsive to the first remote procedure call, thereby providing flow control over the network.

An apparatus for providing flow control over a network according to an aspect of the invention comprises a first computer including a first memory and a first processor configured to execute instructions stored in the first memory to receive a first remote procedure call at the first computer from a second computer remote from the first computer, generate a second remote procedure call to the second computer, the second remote procedure call responsive to the first remote procedure call, monitor for receipt of a release signal from the second computer, the release signal indicating when the second computer is able to receive data responsive to the first remote procedure call, and transmit the data from the first memory of the first computer to the second computer responsive to receipt of the release signal, thereby providing flow control over the network.

Variations of these methods and apparatuses and details of other aspects and embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Problems can result when data is generated by multiple server processes (so-called workers) and aggregated at a central coordinator server or node for transmission to the client. In such a multi-tier server architecture, for example, the coordinator must pace the workers so that their aggregate data rate matches the rate at which the client consumes data. Such problems can be exacerbated where the underlying network layer does not provide flow control. In these cases and others, a flow control scheme can be implemented at the application layer as described herein.

Figure 1:
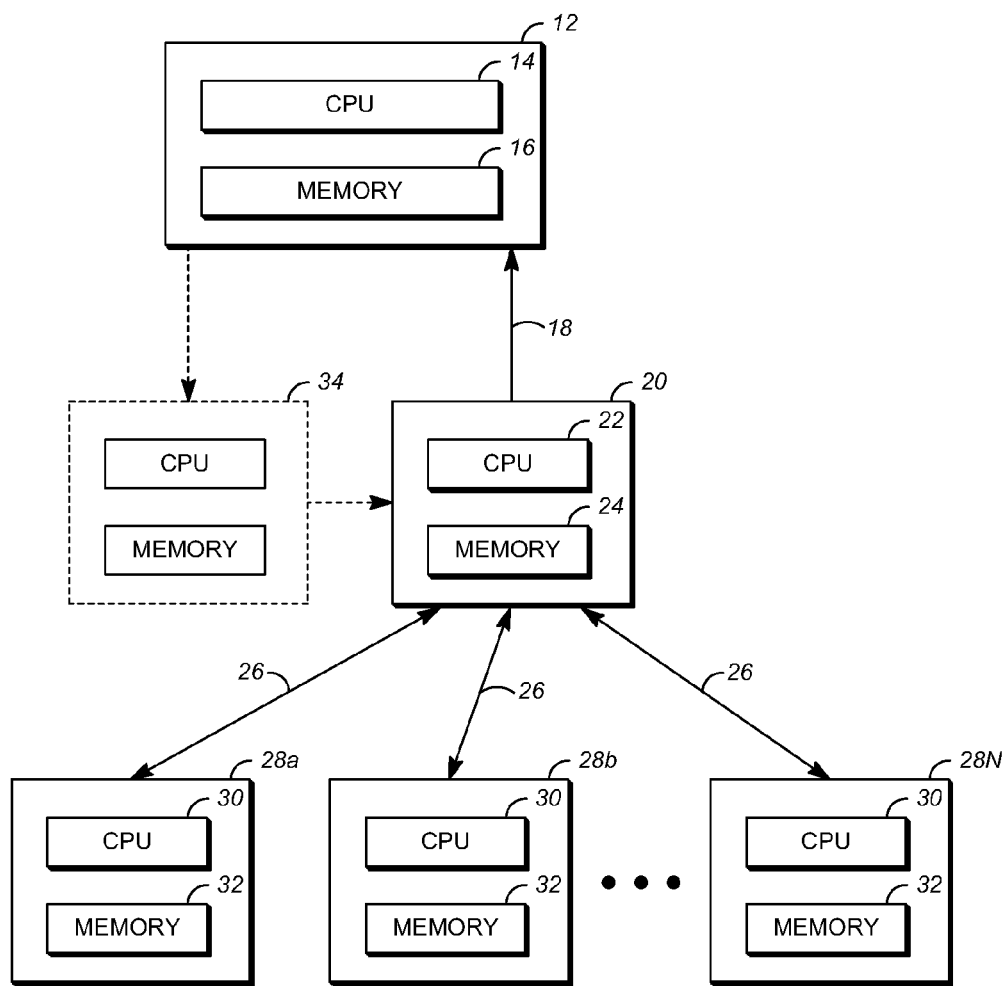
FIG. 1 is a schematic of a network with a multi-tier server architecture and client in which embodiments of the present invention can be implemented.

FIG. 1 is a schematic of a network 10 with a multi-tier server architecture and client in which embodiments of the present invention can be implemented. Network 10 may be the Internet. Network 10 may also be a local area network (LAN), wide area network (WAN), virtual private network (VPN), or any other means of transferring data between one or more clients 12 and servers 20 and 28a-28N. One exemplary client 12 may be, for example, a computer having an internal configuration of hardware including a processor such as a central processing unit (CPU) 14 and a memory 16. CPU 14 is a controller for controlling the operations of client 12. CPU 14 is connected to memory 16 by, for example, a memory bus (not shown). Memory 16 may be random access memory (RAM), read only memory (ROM) and/or any other suitable memory device. Memory 16 can store data and program instructions that are used by CPU 14. Other suitable implementations of client 12 are possible.

Client 12 is connected to a remote coordinator server 20 through a first network connection 18. Coordinator server 20 in one example may be a computer having an internal configuration of hardware including a processor such as a CPU 22 and a memory 24. CPU 22 is a controller for controlling the operations of coordinator server 20. CPU 22 is connected to memory 24 by, for example, a memory bus (not shown). Memory 24 may be RAM, ROM and/or any other suitable memory device. Memory 24 can store data and program instructions that are used by CPU 22. Other suitable implementations of coordinator server 20 are possible.

Coordinator server 20 is connected to each of N remote worker servers 28a, 28b . . . 28N (collectively, worker servers 28) through a respective second network connection 26. In this example, each worker server 28a-28N is a computer having an internal configuration of hardware including a processor such as a CPU 30 and a memory 32. CPU 30 is a controller for controlling the operations of a respective worker server 28a-28N. CPU 30 is connected to memory 32 by, for example, a memory bus (not shown). Memory 32 may be RAM, ROM and/or any other suitable memory device. Memory 32 can store data and program instructions that are used by CPU 30. Other suitable implementations of worker servers 28 are possible. Although each worker server 28a-28N is shown as a separate computer in this example, any of worker servers 28 could be combined into a single computer with more than one processor performing its respective functions as discussed herein.

First network connection 18 and second network connections 26 comprises any means of connecting client 12 and servers 20 and 28 to form a network. For example, connections 18, 26 can be hardwire connections or wireless connections operating according to any number of known communication protocols.

Other implementations of network 10 are possible. For example, one or more intermediate tiers (i.e., servers) can be included in the multi-tier server architecture to further implement flow control over network 10. As shown in the example of FIG. 1, an optional balancer server 34 having a configuration similar to coordinator server 20 is connected between client 12 and one or more coordinator servers 20 by network connections similar to connections 18, 26. Balancer server 34 can be used to determine which coordinator server 20 processes a data request from client 12. This would be particularly useful where multiple clients 12 are making data requests. Balancer server 34 can also be used to implement certain of the functions of coordinator server 20 to minimize processing load on coordinator server 20.

At least three worker servers 28 are shown in this example, but fewer or more are possible. In one embodiment, eight (8) worker servers 28 are incorporated.

In another aspect, one or more of client 12, coordinator server 20 or worker server 28a-28N can include a display configured to display queries and/or the data responsive to the queries. If used, a display may be implemented in various ways, including by a liquid crystal display (LCD), light-emitting diode (LED) or a cathode-ray tube (CRT).

Figure 2:
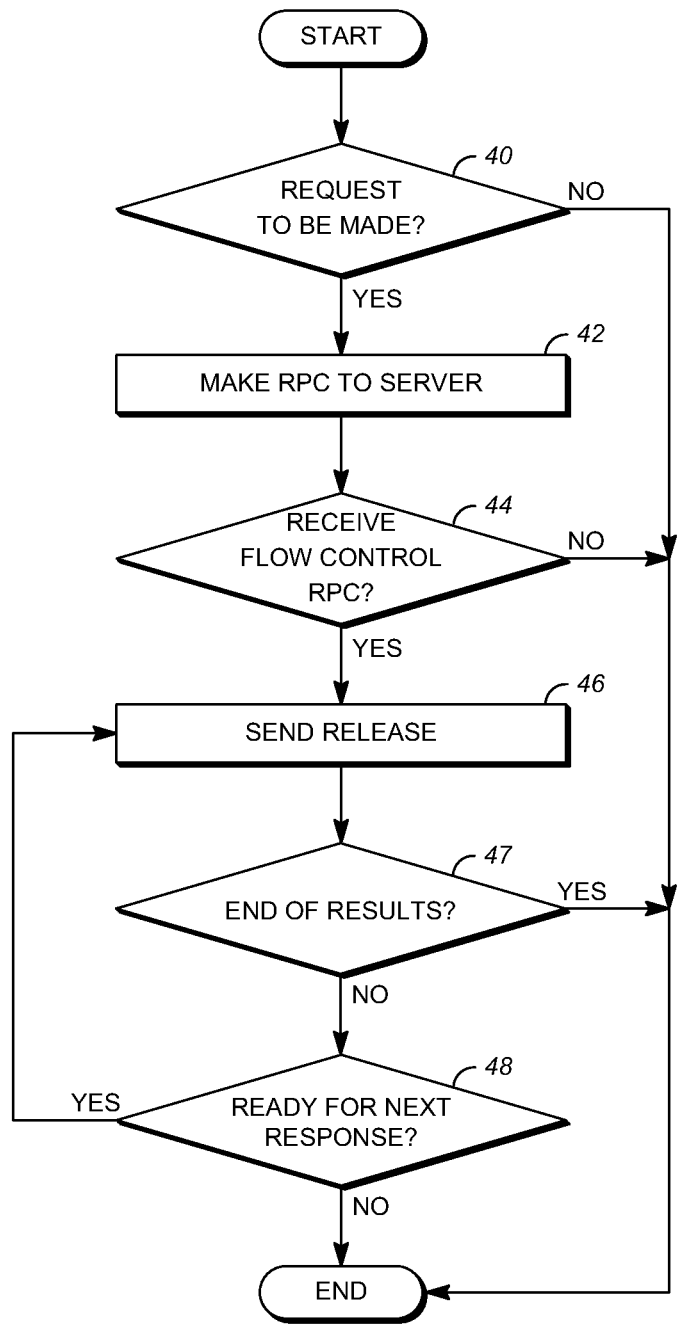
FIG. 2 is a flow chart showing processing of a client according to an embodiment.
Figure 3:
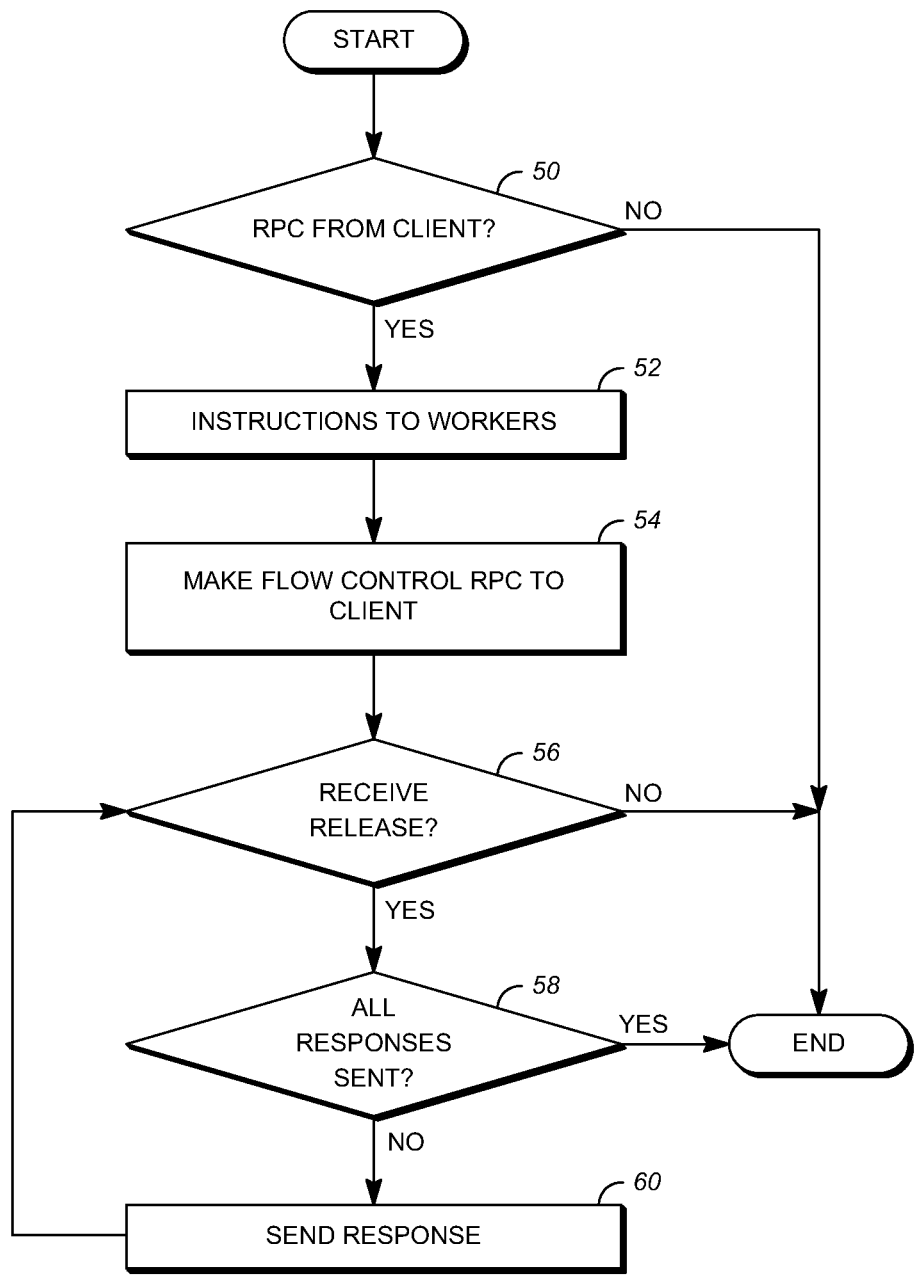
FIG. 3 is a flow chart showing processing of a coordinator server according to the embodiment of FIG. 2.

FIG. 2 is a flow chart showing processing of client 12 according to an embodiment, and FIG. 3 is a flow chart showing processing of coordinator server 20 according to the embodiment of FIG. 2. As described in this example, the processing of FIG. 2 is performed by CPU 14 of client 12, while the processing of FIG. 3 is performed by CPU 22 of coordinator server 20.

Client 12 transmits a request to coordinator server 20, either directly or through balancer server 34. This request is, more particularly, a call for coordinator server 20 to execute a remote procedure (i.e., a series of commands) that will instruct worker servers 28 to perform the data collection, collect the data from worker servers 28 and return the collected data to client 12. Conventionally, such a request is called a remote procedure call (RPC), which is basically a request message sent to a known remote server to execute a specified procedure with supplied parameters. In one exemplary embodiment, the RPC includes parameters such as a number of keywords and invokes procedures for obtaining data related to the number of keywords, such as how many times an ad is displayed over a period of time in response to each keyword and what the "click-through" rate is. The number of keywords searched can be in the millions. As a result, the RPC can involve a very large query set. Coordinator server 20 shards (i.e., splits) the query for processing by worker servers 28. Thus, each worker server 28a-28N gets a portion of the parameters upon which the query is to be performed.

In the absence of flow control, coordinator server 20 sends back to client 12 a series of response messages containing the data generated by worker servers 28 without knowing whether client 12 is ready to receive the data. If a problem results whereby client 12 cannot keep up with the data streaming such that client 12 blocks while processing results, for example, coordinator server 20 or an intermediate server layer would terminate the RPC. Coordinator server 20 could also be shut down where it cannot control the rate at which each of the worker servers 28a-28N sends data. In one scenario without flow control, for example, coordinator server 20 sends results out of memory 24 (e.g. RAM) from multiple worker servers 28 in parallel.

For flow control, a communications channel is needed for client 12 to send feedback to coordinator server 20. In the embodiment of FIG. 2, this processing involves client 12 determining whether a request for data should be made at step 40. Whether a request for data should be made can be determined by, for example, monitoring for a command from a user. Alternatively, for example, such requests could be made according to a predetermined schedule, such as once a day at a particular time. If a request is not to be made, processing ends until a response to the query in step 40 is yes.

If a request for data is to be made responsive to the query in step 40, processing advances through the remaining steps. At next step 42, client 12 makes a RPC to coordinator server 20 directly or indirectly through optional balancing server 34. The communication channel needed by client 12 to send feedback to coordinator server 20 is established by having coordinator server 20 that receives the request make a RPC back to client 12. Herein this latter RPC is called a flow control RPC. Client 12 uses the flow control RPC to send release messages to coordinator server 20. Coordinator server 20 will only send a response message after the client has released it.

More specifically and with reference to FIG. 2, when client 12 receives the flow control RPC in step 44, a set of commands is performed by a procedure stored in memory 16. In step 46, client 12 sends a release message in response to the commands. Client 12 could send the release message to coordinator server 20 directly or indirectly through an intermediate server such as balancing server 34. After sending the release message in step 46, client 12 then determines whether or not it is ready for the next response (i.e., the next chunk of data) from coordinator server 30 in step 48. This determination is based on whether client 12 has sufficient available memory. In one example, client 12 makes this determination by monitoring for the response and, when one is received, detecting an end of the data in the response. This assumes that the chunks of data in the response are of a known and substantially similar size. Client 12 could also monitor its memory 16 while receiving the response to determine when its buffer space is sufficient to start a new download. There are several ways client 12 can make the determination in step 48 within the skill of those in the art provided with the teachings herein.

Once client 12 is ready for the data of another response in step 48, processing returns to step 46 so that client 12 can send another release message. If no additional responses are available from coordinator server 20, processing ends. This can be accomplished using the query in step 48 or adding an additional step in the processing. For example, the query of step 48 performed by client 12 would first detect whether any response is received to the release message sent in step 46. If no response is received, it can be assumed that no additional responses are available. The response to the query in step 48 is no, and processing ends. Another way of determining whether processing can end is to include an additional parameter in the RPC made in step 42 to invoke a procedure in coordinator server 20 to transmit a code to client 12 indicating no additional responses are available. In that case, the processing of FIG. 2 would involve an additional check for this code. In FIG. 2, this is shown in step 47. After sending the release in step 46, the query of step 47 is made as to whether the end of data signal indicating all results have been sent has been received. If not, processing advances to step 48. Otherwise, processing ends. Note that a response can be all of the data from a particular worker server 28a-28N or can be a smaller portion of that data. The response can also be a small amount of data from the overall response from worker servers 28, such as 1000 rows from an overall response containing millions of rows.

As shown in FIG. 3, coordinator server 20 awaits the RPC from client 12 in step 50. Until coordinator server 20 receives the RPC from client 12, processing does not advance. Once client 12 makes the RPC to coordinator server 20, processing advances to send instructions to worker servers 28 in step 52 responsive to the RPC. In this example, these instructions include a shard query, i.e., a query including a portion of the original data, for each worker server 28a-28N. For example, where the data is information related to keywords as described above, each worker server 28a-28N is assigned a portion of the keywords upon which to collect and/or calculate the data. The instructions can also include what data to collect and/or calculate, or the instructions can instead be another RPC with its parameters (e.g. keywords) that calls a procedure stored in memory 32 of a worker server 28a-28N already including what data to collect and/or calculate for each keyword.

After, before or at substantially the same time as sending instructions to worker servers 28 in step 52, coordinator server 20 makes the flow control RPC to client described with respect to FIG. 2. Once coordinator server 20 receives a release message from client 12 in step 56, either directly or indirectly through balancer server 34, coordinator server 20 sends a response if one is available or otherwise ends processing. While there are a number of ways of doing this, in this example, coordinator server 20 first queries in step 58 whether all responses have been sent to client 58. For example, coordinator server 20 could store the number of worker servers 28 performing the data collection/calculation in a counter and decrement the counter each time a response is sent. Alternatively, when worker servers 28 are each sending a number of data clusters, coordinator server 20 could store the number of clusters in total in a counter and decrement the counter each time a response is sent. When the counter equals zero in step 58, all responses are sent. In another example, each worker server 28a-28N could provide an end of data signal when it has no further data to send to coordinator server 20. Processing of coordinator server 20 responsive to the RPC from client 12 then ends.

If all responses have not been sent as indicated by the answer to the query of step 58, processing advances to step 60. At step 60, coordinator server 20 transmits a response to client 12. Coordinator server 20 then monitors for the next release signal from client 12 by returning to step 56 and repeating the steps until all responses have been sent.

As mentioned above with respect to the description of FIG. 2, client 12 has more than one way to determine whether it is ready to receive additional data in a response, not just the end of the data in the previous response. In some of these examples, client 12 may have surplus release messages outstanding at server 20. That is, server 20 may not be able to respond immediately to a release message. In such a case, the processing of FIG. 3 can be modified so that coordinator server 20 tracks the number of outstanding release messages in addition to tracking the number of responses to be released. Coordinator server 20 could then continue sending messages until both counts get to zero. This pipelining effect could improve throughput.

Note that both coordinator server 20 and client 12 may have multiple requests in progress at the same time in some embodiments, so a unique identifier can be associated with the pair of RPCs involved in a flow controlled query. Client 12 generates this ID and includes it in the initial RPC, and coordinator server 20 echoes back the ID to client 12 to associate the incoming flow control RPC with the initial RPC. The ID can be merely a number, or it can also include the network address of client 12.

Figure 4:
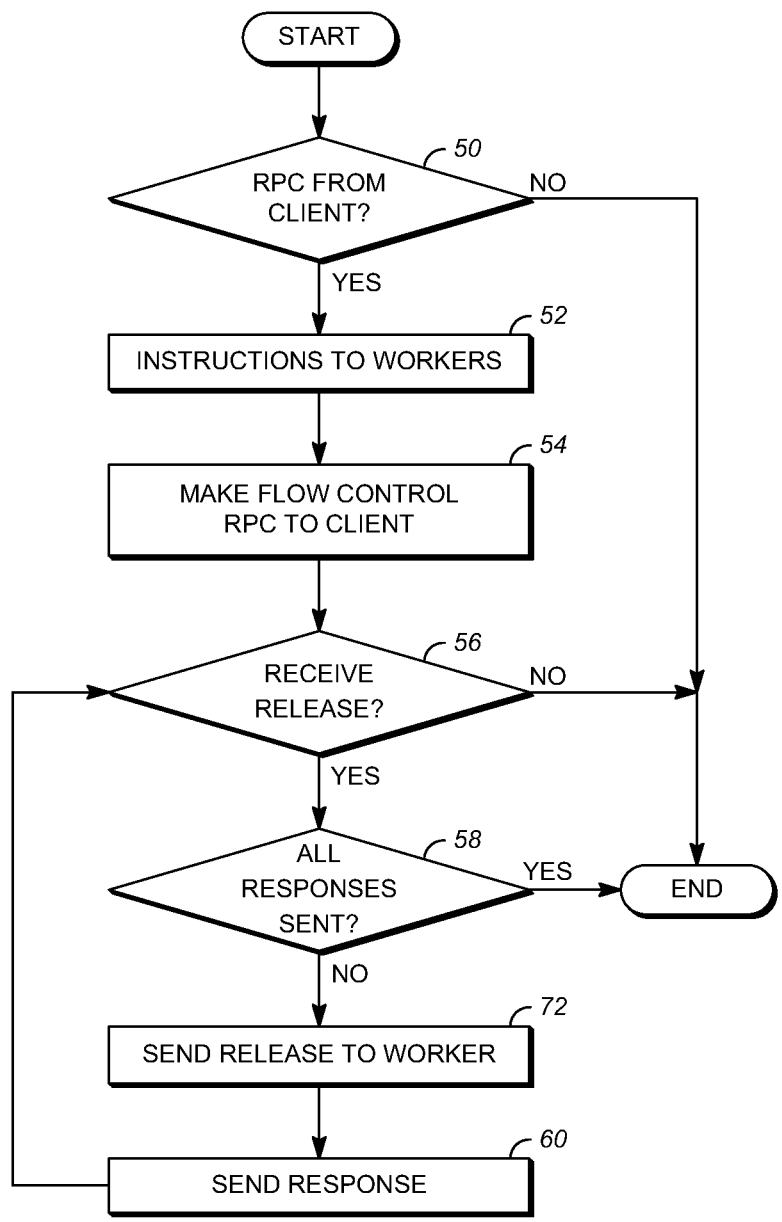
FIG. 4 is a flow chart showing processing of a coordinator server according to another embodiment.

The processing above describes the communication between client 12 and coordinator server 20 in a situation where coordinator server 20 receives responses from each of worker servers 28a-28N upon completion, e.g. first-come, first served queuing. In certain embodiments, however, it is desirable for coordinator server 20 to control the rate at which worker servers 28 send data to it as well. For this, coordinator server 20 issues a flow controlled RPC to each of the worker servers 28a-28N as discussed in more detail below. The processing of client 12 is the same as previously described with respect to FIG. 2. FIG. 4 is a flow chart showing processing of coordinator server 20 according to another embodiment that incorporates this additional flow control. The processing of coordinator server 20 in this embodiment is mostly the same as that described with respect to FIG. 3, so only the differences are described here.

After receiving the RPC made by client 12 in step 50, coordinator server 20 transmits instructions to worker servers 28 in step 70. As with respect to step 52 of FIG. 3, these instructions include the shard query for each worker server 28a-28N and optionally other instructions related thereto. In step 54, the RPC causes each worker server 28a-28N to call back to coordinator server 20 to establish a flow control RPC. Worker servers 28 then await a release message before sending its response to the shard query. When client 12 issues a release message such that coordinator server 20 receives it in step 56, coordinator server 20 passes the release message to one of worker servers 28a-28N in step 72 after determining in step 58 that all responses were not yet sent to client 12. Worker server 28a-28N receiving the release message could be the one that most recently sent response data. Alternatively, if multiple worker servers 28 are actively sending response data, release messages can be forwarded to them in a round-robin scheduling scheme until all responses are received by coordinator server 20 and sent to client 12 as indicated by a positive response to the query of step 58.

The variations in the embodiment of FIGS. 2 and 3 described above where coordinator server 20 can accept and keep track of multiple release requests can also be implemented in the embodiment of FIG. 4. Further, it may be beneficial for performance to have coordinator server 20 transmit multiple release messages at a time. The number of messages so released in this case would be fixed so that the maximum buffer space needed on coordinator server 20 is bounded. For example, to get the system moving initially when responses are relatively short, the processing of FIG. 4 can be modified so as to send a release to all worker servers 28 in step 72. Each will then send a single response so as to create a pipeline for the transmission of data. The response messages would be queued at coordinator server 20 if client 12 falls behind.

As described in these embodiments, coordinator server 20 receives the initial RPC from client 12, transmits instructions to worker servers 28 and collects the responses from worker servers 28 to transmit them to client 12. In another implementation of the teachings herein, client 12 could interact directly with each worker server 28a-28N after balancer server 34 and/or coordinator server 20 shards the query. In such a case, for example, client 12 receives, as part of the flow control RPC responsive to its initial RPC, parameters including the identification (e.g. network addresses) of worker servers 28a-28N. Client 12 then sends its release messages directly to worker servers 28a-28N for them to send data as previously described in a point-to-point flow between client 12 and each worker server 28a-28N.

Optionally, coordinator server 20 can include two different sets of instructions responsive to an initial RPC made from client 12. Specifically, the initial RPC can include, as part of its message, strings associated with flow control such as the ID described above or an indicator bit indicating whether or not the flow control RPC should be made by coordinator server 20.

The embodiments of client 12, coordinator server 20 and/or worker servers 28 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of client 12 and servers 20, 28 do not necessarily have to be implemented in the same manner.

Further, in one embodiment for example, client 12, coordinator server 20 or each worker server 28a-28N can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

All or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the claims, which scope is to be accorded the broadest interpretation so as to encompass all such modifications and equivalent structure as is permitted under the law.

What is claimed is:

1. A computer-implemented method comprising:

receiving, by a coordinator computer and from a client computer that is remote from the coordinator computer, a request to initiate execution of a data collection operation; in response to receiving the request to initiate execution of the data collection operation, establishing a feedback communication channel by transmitting a flow control message from the coordinator computer to the client computer;

after transmitting the flow control message from the coordinator computer to the client computer, receiving, from the client computer, a release message that indicates that the client computer is ready to receive data associated with the data collection operation;

in response to receiving the release message from the client computer, relaying, by the coordinator computer to at least one worker computer, the release message that indicates that the client computer is ready to receive data associated with the data collection operation, as received by the coordinator computer and from the client computer;

after relaying the release message that indicates that the client computer is ready to receive data associated with the data collection operation to the at least one worker computer, receiving data associated with the data collection operation from the at least one worker computer; and transmitting at least a portion of the data associated with the data collection operation, as received by the coordinator computer and from the at least one worker computer, from the coordinator computer to the client computer.

2. The computer-implemented method of claim 1, wherein receiving, by the coordinator computer and from the client computer that is remote from the coordinator computer, the request to initiate execution of the data collection operation, comprises receiving, by the coordinator computer and from the client computer that is remote from the coordinator computer, a user-initiated request to initiate execution of the data collection operation.

3. The computer-implemented method of claim 1, comprising:

after establishing the feedback communication channel by transmitting the flow control message from the coordinator computer to the client computer, and before transmitting data associated with the data collection operation from the coordinator computer to the client computer:

generating, based at least on the request to initiate execution of the data collection operation, a plurality of different queries at the coordinator computer, transmitting each of the plurality of different queries from the coordinator computer to each of a plurality of worker computers, and receiving, by the coordinator computer and from each of the plurality of worker computers, data associated with the data collection operation, wherein transmitting at least a portion of the data associated with the data collection operation from the coordinator computer to the client computer comprises transmitting a portion of the data associated with the data collection operation, as received by the coordinator and from the plurality of worker computers, from the coordinator computer to the client computer.

4. The computer-implemented method of claim 3, comprising:
- after transmitting at least a portion of the data associated with the data collection operation from the coordinator computer to the client computer, receiving, from the client computer, another release message that indicates that the client computer is ready to receive data associated with the data collection operation;
- determining that all of the portions of the data associated with the data collection operation, as received by the coordinator computer and from the plurality of worker computers, have already been transmitted from the coordinator computer to the client computer; and
- in response to determining that all of the portions of the data associated with the data collection operation, as received by the coordinator computer and from the plurality of worker computers, have already been transmitted from the coordinator computer to the client computer, transmitting, from the coordinator computer to the client computer, a message that indicates that the client computer has already transmitted all of the data associated with the data collection operation that the coordinator computer has received from the plurality of worker computers.

5. The computer-implemented method of claim 3, wherein:
- receiving, by the coordinator computer and from the client computer that is remote from the coordinator computer, the request to initiate execution of the data collection operation, comprises receiving, by the coordinator computer and from the client computer that is remote from the coordinator computer, a request to initiate execution of the data collection operation that includes instructions associated with a plurality of keywords; and
- generating, based at least on the request to initiate execution of the data collection operation, the plurality of different queries at the coordinator computer, comprises generating, at the coordinator computer and based at least on the instructions associated with the plurality of keywords, a plurality of different queries that each include instructions associated with a different set of the plurality of keywords, respectively.

6. The computer-implemented method of claim 3, comprising:
- after transmitting at least a portion of the data associated with the data collection operation from the coordinator computer to the client computer, receiving, from the client computer, another release message that indicates that the client computer is ready to receive data associated with the data collection operation; and
- in response to receiving the other release message from the client computer, transmitting, from the coordinator computer to the client computer, another, different portion of the data associated with the data collection operation, as received by the coordinator computer and from the plurality of work computers.

7. A system comprising:
- one or more data processing apparatus; and
- a computer-readable storage device having stored thereon instructions that, when executed by the one or more data processing apparatus, cause the one or more data processing apparatus to perform operations comprising:
  - receiving, by a coordinator computer and from a client computer that is remote from the coordinator computer, a request to initiate execution of a data collection operation; in response to receiving the request to initiate execution of the data collection operation, establishing a feedback communication channel by transmitting a flow control message from the coordinator computer to the client computer;
  - after transmitting the flow control message from the coordinator computer to the client computer, receiving, from the client computer, a release message that indicates that the client computer is ready to receive data associated with the data collection operation;
  - in response to receiving the release message from the client computer, relaying, by the coordinator computer to at least one worker computer, the release message that indicates that the client computer is ready to receive data associated with the data collection operation, as received by the coordinator computer and from the client computer;
  - after relaying the release message that indicates that the client computer is ready to receive data associated with the data collection operation to the at least one worker computer, receiving data associated with the data collection operation from the at least one worker computer; and
  - transmitting at least a portion of the data associated with the data collection operation, as received by the coordinator computer and from the at least one worker computer, from the coordinator computer to the client computer.

8. The system of claim 7, wherein receiving, by the coordinator computer and from the client computer that is remote from the coordinator computer, the request to initiate execution of the data collection operation, comprises receiving, by the coordinator computer and from the client computer that is remote from the coordinator computer, a user-initiated request to initiate execution of the data collection operation.

9. The system of claim 7, wherein the operations further comprise:
- after establishing the feedback communication channel by transmitting the flow control message from the coordinator computer to the client computer, and before transmitting data associated with the data collection operation from the coordinator computer to the client computer:
  - generating, based at least on the request to initiate execution of the data collection operation, a plurality of different queries at the coordinator computer,
  - transmitting each of the plurality of different queries from the coordinator computer to each of a plurality of worker computers, and
  - receiving, by the coordinator computer and from each of the plurality of worker computers, data associated with the data collection operation,
- wherein transmitting at least a portion of the data associated with the data collection operation from the coordinator computer to the client computer comprises transmitting a portion of the data associated with the data collection operation, as received by the coordinator and from the plurality of worker computers, from the coordinator computer to the client computer.

10. The system of claim 9, wherein the operations further comprise:
- after transmitting at least a portion of the data associated with the data collection operation from the coordinator computer to the client computer, receiving, from the client computer, another release message that indicates that the client computer is ready to receive data associated with the data collection operation; and
- in response to determining that all of the portions of the data associated with the data collection operation, as received by the coordinator computer and from the plurality of worker computers, have already been transmitted from the coordinator computer to the client computer, transmitting, from the coordinator computer to the client computer, a message that indicates that the client computer has already transmitted all of the data associated with the data collection operation that the coordinator computer has received from the plurality of worker computers.

11. The system of claim 9, wherein:
receiving, by the coordinator computer and from the client computer that is remote from the coordinator computer, the request to initiate execution of the data collection operation, comprises receiving, by the coordinator computer and from the client computer that is remote from the coordinator computer, a request to initiate execution of the data collection operation that includes instructions associated with a plurality of keywords; and
generating, based at least on the request to initiate execution of the data collection operation, the plurality of different queries at the coordinator computer, comprises generating, at the coordinator computer and based at least on the instructions associated with the plurality of keywords, a plurality of different queries that each include instructions associated with a different set of the plurality of keywords, respectively.

12. The system of claim 9, wherein the operations further comprise:
after transmitting at least a portion of the data associated with the data collection operation from the coordinator computer to the client computer, receiving, from the client computer, another release message that indicates that the client computer is ready to receive data associated with the data collection operation; and
in response to receiving the other release message from the client computer, transmitting, from the coordinator computer to the client computer, another, different portion of the data associated with the data collection operation, as received by the coordinator computer and from the plurality of work computers.

13. A non-transitory computer-readable storage device having instructions stored thereon that, when executed by a computing device, cause the computing device to perform operations comprising:
receiving, by a coordinator computer and from a client computer that is remote from the coordinator computer, a request to initiate execution of a data collection operation; in response to receiving the request to initiate execution of the data collection operation, establishing a feedback communication channel by transmitting a flow control message from the coordinator computer to the client computer;
after transmitting the flow control message from the coordinator computer to the client computer, receiving, from the client computer, a release message that indicates that the client computer is ready to receive data associated with the data collection operation;
in response to receiving the release message from the client computer, relaying, by the coordinator computer to at least one worker computer, the release message that indicates that the client computer is ready to receive data associated with the data collection operation, as received by the coordinator computer and from the client computer;
after relaying the release message that indicates that the client computer is ready to receive data associated with the data collection operation to the at least one worker computer, receiving data associated with the data collection operation from the at least one worker computer; and
transmitting at least a portion of the data associated with the data collection operation, as received by the coordinator computer and from the at least one worker computer, from the coordinator computer to the client computer.

14. The storage device of claim 13, wherein the operations further comprise:
after establishing the feedback communication channel by transmitting the flow control message from the coordinator computer to the client computer, and before transmitting data associated with the data collection operation from the coordinator computer to the client computer:
generating, based at least on the request to initiate execution of the data collection operation, a plurality of different queries at the coordinator computer,
transmitting each of the plurality of different queries from the coordinator computer to each of a plurality of worker computers, and
receiving, by the coordinator computer and from each of the plurality of worker computers, data associated with the data collection operation,
wherein transmitting at least a portion of the data associated with the data collection operation from the coordinator computer to the client computer comprises transmitting a portion of the data associated with the data collection operation, as received by the coordinator and from the plurality of worker computers, from the coordinator computer to the client computer.

15. The storage device of claim 14, wherein the operations further comprise:
after transmitting at least a portion of the data associated with the data collection operation from the coordinator computer to the client computer, receiving, from the client computer, another release message that indicates that the client computer is ready to receive data associated with the data collection operation; and
in response to determining that all of the portions of the data associated with the data collection operation, as received by the coordinator computer and from the plurality of worker computers, have already been transmitted from the coordinator computer to the client computer, transmitting, from the coordinator computer to the client computer, a message that indicates that the client computer has already transmitted all of the data associated with the data collection operation that the coordinator computer has received from the plurality of worker computers.

16. The storage device of claim 14, wherein:
receiving, by the coordinator computer and from the client computer that is remote from the coordinator computer, the request to initiate execution of the data collection operation, comprises receiving, by the coordinator computer and from the client computer that is remote from the coordinator computer, a request to initiate execution of the data collection operation that includes instructions associated with a plurality of keywords; and
generating, based at least on the request to initiate execution of the data collection operation, the plurality of different queries at the coordinator computer, comprises generating, at the coordinator computer and based at least on the instructions associated with the plurality of keywords, a plurality of different queries that each include instructions associated with a different set of the plurality of keywords, respectively.

17. The storage device of claim 14, wherein the operations further comprise:

after transmitting at least a portion of the data associated with the data collection operation from the coordinator computer to the client computer, receiving, from the client computer, another release message that indicates that the client computer is ready to receive data associated with the data collection operation; and in response to receiving the other release message from the client computer, transmitting, from the coordinator computer to the client computer, another, different portion of the data associated with the data collection operation, as received by the coordinator computer and from the plurality of work computers.

* * * * *